United States Patent [19]

Kammin et al.

[11] Patent Number: 4,489,122

[45] Date of Patent: Dec. 18, 1984

[54] TRANSPARENCIES FOR ELECTROSTATIC PRINTING

[75] Inventors: Marvin R. Kammin, Minneapolis; Terrance J. Russell, White Bear Lake, both of Minn.

[73] Assignee: Minnesota Mining and Manufacturing Company, St. Paul, Minn.

[21] Appl. No.: 416,217

[22] Filed: Oct. 13, 1982

[51] Int. Cl.[3] ......................... B05D 1/36; B32B 27/08

[52] U.S. Cl. .................................... 428/212; 428/217; 428/327; 428/331; 428/483; 428/519

[58] Field of Search ............... 428/217, 483, 519, 331, 428/212, 327; 427/121

[56] References Cited

U.S. PATENT DOCUMENTS

| | | | |
|---|---|---|---|
| 2,819,985 | 1/1958 | Cobbs, Jr. | 428/519 X |
| 3,037,879 | 6/1962 | Newman et al. | 428/483 X |
| 3,592,725 | 7/1971 | Yoshimura et al. | 428/331 X |
| 4,038,449 | 7/1977 | Uemura et al. | 428/519 X |
| 4,301,195 | 11/1981 | Mercer et al. | 428/483 X |

*Primary Examiner*—George F. Lesmes
*Assistant Examiner*—Nancy A. B. Swisher
*Attorney, Agent, or Firm*—Donald M. Sell; James A. Smith; David L. Weinstein

[57] ABSTRACT

A sheet material for electrostatic production, as by xerography, of transparencies comprising a synthetic polymeric film base having at least one surface receptive to adhesion and fusion of toner. The toner-receptive surface of the film base has a two-layer coating which comprises a first layer of a conformable material coated over the surface of the polymeric film base and a second layer of a rigid material coated over the first layer. The first layer is soft enough to conform to the shape of toner particles coming in contact with the sheet material during use. The second layer provides the film with a non-sticky, lower friction surface in order to allow the sheets to be fed to a copying machine from a stack. This two-layer coating allows the toner used in an electrostatic printing process to be bonded to the sheet material by means of cold pressure fusing so that images created by the electrostatic process can be fixed without heat.

11 Claims, 3 Drawing Figures

TRANSPARENCIES FOR ELECTROSTATIC PRINTING

BACKGROUND OF THE INVENTION

The invention relates to the production of transparencies which may be utilized in visual presentations wherein images are commonly projected with magnification onto a screen for the simultaneous viewing by a plurality of observers. More particularly, the invention relates to a coating which can be applied to a transparent polymeric film base which is to be imaged by means of an electrostatic printing technique, such as xerography.

At present, xerographic copiers which use plain paper for reproduction of images from a master generally employ a dry powder, called "toner" to form the image. There is a special class of plain paper copiers, called "liquid toner copiers" which use a suspension of toner in a liquid, such as deodorized kerosene, but they are not included in the scope of this invention.

As is well known, transfer electrostatic copying commonly involves imparting a uniform electrostatic charge, either positive or negative, depending on the specific machine under consideration, to a photoconducting surface which will hold a charge only in the dark, such as a selenium coated drum. This may be accomplished by passing the drum under a series of corona-discharge wires in the dark. The photoconducting surface is then exposed through a lens system to a document or article bearing the image which is to be formed. In areas where light strikes the photoconducting surface the charge is dissipated and flows off through a conducting support to ground, with the electrostatic charge remaining largely intact in the image areas. Next, oppositely charged toner powder comprising a pigmented thermoplastic resin is brought into contact with the photoconducting surface and clings by electrostatic attraction to the charged areas of the surface. A sheet which is to receive the image is placed over the powder image, and is given a charge, such as by use of corona-discharge wires. As a result, a large portion of the charged powder on the photoconducting surface is transferred to the sheet. Finally, the toner is fused to the sheet by application of heat, pressure, or a combination of both.

The toner powder is generally comprised of a polymeric resin, a pigment, and various additives to control the surface charge and other characteristics necessary for reliable operation. The most common method of fusing the toner to the copy sheet is to heat it, either with lamps or heated rolls. Heated rolls combine heat and pressure, thus reducing the amount of heat needed. Cold pressure fusing, which uses no heat and very high pressures, may also be used.

When toner is fused to paper with cold pressure fusing, the crush rolls press the toner into the pores of the paper, with the result that mechanical, as well as adhesive, bonding occurs. The pores operate to increase the area available for adhesive bonding and to make the sheet more pliable to allow greater intimacy of contact. Moreover, because most of the toner ends up below the surface of the paper, it is protected from scratching by the structure of the paper itself.

When toner is fused to polymeric film with cold pressure fusing, fusing depends primarily on surface adhesion, with little or no mechanical anchoring and with no penetration of the film surface, because the film is not porous and is not as deformable as paper. The lack of deformability of the film surface is a major barrier to the intimate contact between toner and film, which is necessary for good adhesion.

There are at least three general approaches for fushing toner to a film. The first approach involves using coatings which provide adhesive compatibility with the toner resin, so as to form strong bonds between toner and film. An essential feature of any adhesion process is intimate contact between the surfaces to be adhered. If these surfaces are solid, a certain amount of conformability is needed to permit this contact. This first approach does not address this need for conformability. The second approach involves the creation of artificial pores in the film by blending an incompatible elastomer with a harder polymer and coating this mixture onto the film. The elastomer globules formed thereby appear as pores to the harder toner partices, thus providing a structure similar to that of paper. Although this second approach can provide good adhesion, it results in a very hazy film, on the order of 23 percent as measured in the Gardner hazemeter, compared to the 10 percent maximum usually desired for transparencies. The films produced by this approach tend to be sticky, with high friction, thus resulting in difficulty in feeding the copying machine. A third approach involves adding high levels of particulate material to the film coating, so as to create a rough surface on the film with many valleys and crevices, into which the toner can be pressed by the fusing process. If the coating resin also has high adhesive compatibility with the toner particles, the resulting film will have good toner adhesion. However, such a film would exhibit high haze.

SUMMARY OF THE INVENTION

This invention involves a sheet material for utilization in electrostatic production of transparencies comprising a synthetic polymeric film base having at least one surface which bears a coating that is receptive to adhesion and fusion of toner. The film base has on its surface a two-layer coating comprising a first layer, adhered to the film base, perhaps with the aid of a primer or adhesion promoter or both, said first layer being conformable to the shape of the toner particles which come in contact with the sheet material, and a second layer, coated over the first layer, said second layer being harder than the first layer and serving to provide the film base with a non-sticky, low friction surface, so that the sheets can be stacked for feeding by the copying machine.

The sheet material of this invention is relatively economical, and it can be used in commercially available copying machines without modification and by untrained operators. The film will allow intimate contact of toner and the sheet material, so that an adherent image of a permanent character is formed without sacrificing optical quality or machine feeding reliability. The sheet material is particularly suitable for use with cold pressure fusing techniques.

DETAILED DESCRIPTION OF THE INVENTION

Figure 1:
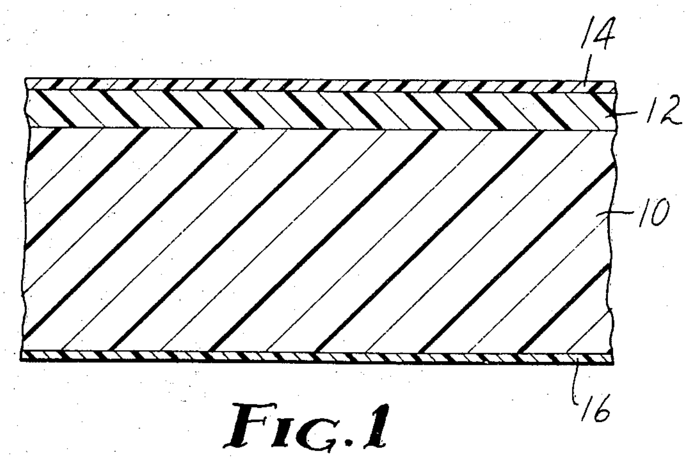
FIG. 1 is a section view of the coating of the present invention adhered to a film substrate.

The sheet material for production of the transparency is shown in FIG. 1. The film base 10 is a synthetic polymeric material normally used for transparencies, such as polyethylene terephthalate (PET). Suitable film materials are formed from transparent, flexible polymers. The film must be transparent to visible light. These film materials include, but are not limited to, polyester, polystyrene, cellulose acetate, acrylic, polycarbonate, or polypropylene. The preferred material is polyester, particularly polyethylene terephthalate, because of its heat and solvent resistance, and aesthetically pleasing feel and appearance. The other polymeric materials suffer from various disadvantages, such as solubility in the coating solutions, poor heat resistance, or poor feel. Another problem with some film materials is poor coating adhesion.

Preferably the polyester which is utilized in preparing the film base is linear polyethylene terephthalate sheet which has been biaxially oriented and heat set to provide improved dimensional stability. Orientation and heat setting are conducted before coatings are applied. A suitable thickness for the uncoated film ranges from about 63 micrometers to about 177 micrometers. A preferred thickness is about 100 micrometers.

The surface of the film base material which is to be receptive to adhesion and fusion of xerographic toner is modified by the presence of a two-layer toner receptive coating. The first layer 12, which is coated over the surface of the film base 10, is a relatively soft, conformable sublayer, or cushion. The second layer 14 is a relatively hard, deformable layer coated over the first layer 12. When toner is fused to the sheet material by means of a pressure fusing system, and, in particular by means of a cold pressure fusing system, the toner particles can cause the overcoat layer 14 to deform to accommodate the toner particles. The purpose of the conformable sublayer, or cushion layer 12 is to allow deformation of the overcoat layer 14 by conforming to the indentation of layer 14 by toner particles, so as to provide intimate contact of the sheet material with the toner. If the toner particles should break through the overcoat layer 14 so as to come into contact with the conformable sublayer 12, both mechanical and adhesive forces will aid in adhering the toner particles to the sheet material. The overcoat layer 14 is also formulated to have adhesive compatibility with the toner, thus promoting adhesion.

While any soft, conformable material may be suitable for the first layer 12, the preferred materials are those elastomers of the sort used in pressure sensitive adhesives, and which have the ability to cold flow, i.e. the ability to retain a permanent set after deformation.

Suitable elastomers include, but are not limited to, polyisobutylene, copolymers of styrene and butadiene, copolymers of styrene and isoprene, copolymers of styrene and ethylene, and copolymers of styrene and butylene. Suitable commercially available elastomers include "Kraton" 1107 (styrene/isoprene copolymer), "Kraton" 1102 (styrene/butadiene copolymer), "Kraton" 1101 (styrene/butadiene copolymer), "Kraton" G1650 (styrene/ethylene copolymer), and "Kraton" G1652 (styrene/butylene copolymer) all of which are manufactured by Shell Chemical Co. Another commercialy available elastomer is "Vistanex" L-100, a polyisobutylene manufactured by Exxon. The conformable layer should have a Shore hardness of from about A30 to about A95. Preferably the Shore hardness should range from about A35 to about A71. It is preferred that the Shore hardness of the material of the conformable layer be closer to A35 than to the higher end of the allowable range. The reason for this preference is that as Shore hardness increases, the coating weight required for the conformable layer also increases. Therefore, a lower Shore hardness value requires a lower coating weight. Lower coating weights are preferred because less raw material is required and lower coating weights result in coatings which are more resistant to visible surface damage. However, a Shore hardness much below A35 results in poor toner adhesion. A Shore hardness value of A30 is probably the lowest practicable value. Shore hardness may be determined in accordance with the procedures of ASTM Designation D2240-75. Of course, the layer of elastomeric material must be transparent to visible light.

When "Vistanex" L-100 polyisobutylene is employed as the conformable layer, the coating weight may range from about 0.73 to about 1.3 g/m$^2$, and the coating thickness may range from about 0.8 to about 1.4 micrometers. When "Kraton" 1101 is employed as the conformable layer, the coating weight is preferably about 3.4 g/m$^2$ and the coating thickness is preferably 3.7 micrometers. The coating thickness and coating weight are dependent upon the particular elastomer employed. One skilled in the art can determine the optimum coating thickness and coating weight by routine experimentation.

The overcoat layer 14 should be a material which adheres to the toner when pressure is applied, but which is non-tacky. Suitable polymers include, but are not limited to, polyvinyl acetate, and copolymers of methyl methacrylate/ethyl acrylate/isooctylacrylate. A terpolymer consisting of 52.5% methyl methacrylate/43.0% ethylacrylate/4.5% isooctyl acrylate is suitable for forming the overcoat layer 14. Blends of the foregoing polymers may also be employed. The coefficient of static, or "starting" friction, measured between the image side of one sheet of transparency film and the back side (non-image side) of an adjacent sheet of transparency film, should be equal to or less than 0.5, for reliable feeding. A preferable coefficient of static friction is in the range of 0.3 to 0.4. The overcoat layer must be made of a material which provides a coefficient of static friction equal to or less than about 0.5. The coefficient of friction is determined in accordance with ASTM D1894-78. The material of the overcoat layer should have a glass transition temperature in the vicinity of normal room temperature, i.e. about 25° C. Polyvinyl acetate has a glass transition temperature of about 29° C. The copolymer of methyl methacrylate/ethyl acrylate/isooctyl acrylate that is suitable for the overcoat layer has a glass transition temperature of about 20–25° C. Glass transition temperatures for the overcoat layer 14 may range from about 20° C. to about 40° C. Below 20° C., the coating is likely to be too soft and sticky. Above 40° C., toner adhesion is badly compromised. The Shore hardness of the overcoat layer 14 preferably ranges from D80 to D90, as determined in accordance with the procedures of ASTM Designation D2240-75. Polymers having a Shore hardness of as low as D60 can be used. The polyvinyl acetate used in the present invention has a Shore hardness which ranges from about D80 to about D85. The coating weight may range from about 1.1 to about 2.2 g/m$^2$, and the coating thickness may range from about 0.9 to about 1.8 micrometers. As with the film base and the layer of elastomeric material, the overcoat layer must be transparent to visible light.

The elastomeric material may be applied to the primed or unprimed transparency film by conventional coating techniques. The preferred method is rotogravure coating. Reverse roll coating is also desirable. The overcoat material may be applied to the dried elastomeric layer by conventional coating techniques. Rotogravure coating and reverse roll coating are the preferred methods for applying the overcoat.

Several additives may be incorporated into the overcoat layer 14. Surface rougheners may be added to the overcoat layer 14 to reduce the tendency of the sheets of film to adhere to one another when stacked. Rougheners consist of particles suspended in the coating solution. The primary requirements are that they be of the appropriate size, i.e. large enough to provide roughness, but not so large as to be obviously visible; that they have a refractive index closely matching that of the coating; and that they not be excessively abrasive. Suitable roughening agents include urea formaldehyde particles, and amorphous silica particles. A roughening agent which is particularly preferred is "Pergopak" M-2, which comprises urea-formaldehyde particles manufactured by Ciba-Geigy. Antistatic agents may be added to reduce electrostatic cling. Any antistatic agent which gives a surface conductivity sufficient to drain off static charge, without destroying other necessary properties, is suitable. Quaternary ammonium compounds and amines are the most common antistatic agents. Suitable antistatic agents include "Cyastat" SN, which is stearamidopropyldimethyl-B-hydroxyethylammonium nitrate, manufactured by American Cyanamid and "Cyastat" 609, which is N,N-bis-(2-hydroxyethyl)-N-(3′-dodecylocy-2′-hydroxypropyl) methylammonium methosulfate, manufactured by American Cyanamid.

Another additive which, when added to the polyisobutylene of layer 12, particularly enhances the cold pressure fusing film of the present invention is an adhesion promoter for promoting adhesion between the overcoat layer 14 and the conformable layer 12. The preferred adhesion promoter is a chlorinated polyolefin having the product designation CP-153-2 and manufactured by Eastman. The preferred ratio of adhesion promoter to polyisobutylene is 1:9 on a dry weight basis.

The transparent polymeric film base may be treated with a transparent primer coating (not shown) prior to being coated with the conformable layer. The purpose of the primer coating is to improve adhesion of the conformable layer 12 to the film 10. Suitable materials for the primer coating include polyvinylidene chloride and polyester resins which are soluble in organic solvents. A preferred primer coating is "Vitel" PE-200, a polyester manufactured by Goodyear. The coating weight of the primer can range from about 0.2 g/m$^2$ to about 1.1 g/m$^2$.

The side of the transparent polymeric film base which does not bear the toner-receptive coating may also be treated with a coating material 16 in order to reduce electrostatic charging and to reduce sheet-to-sheet friction and sticking. Suitable coating materials for this purpose include polyvinyl acetate and polymethyl methacrylate, along with antistatic agents. The preferred coating material is polyvinyl acetate. The coating weight may range from about 1.1 to about 2.2 g/m$^2$, and the coating thickness may range from about 0.9 to about 1.8 micrometers.

Figure 2:
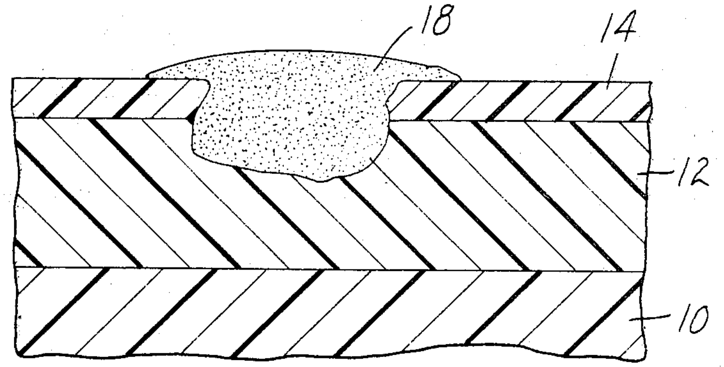
FIG. 2 is a section view of the toner penetration of the first layer of the coating.
Figure 3:
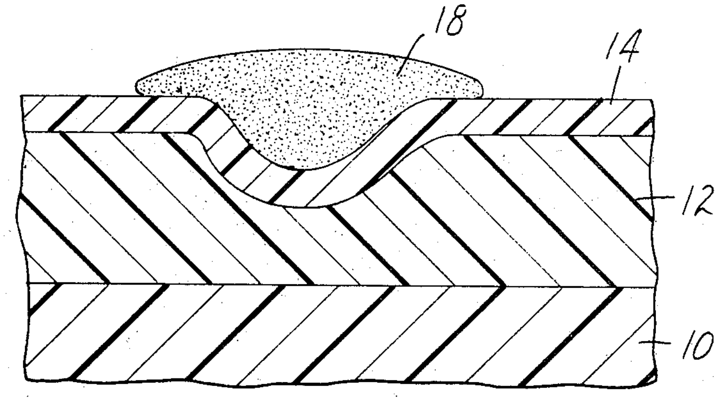
FIG. 3 is a section view of toner embedment into the first layer of the coating, without actual penetration of the first layer. It is believed that this is the more common mode of toner attachment, as compared with the mode of FIG. 2.

Bonding of the toner powder to the two-layer coat can occur by several modes. In one mode, depicted in FIG. 2, some of the toner particle 18 is pressed through the overcoat layer 14 into the conformable layer 12, where both mechanical and adhesive forces hold the toner. Thus the two-layer system acts as an anchoring site for outer layers of toner. In another mode, depicted in FIG. 3, none of the toner particle 18 breaks through the overcoat layer 14. The toner particle only indents the overcoat layer 14, thus deforming this layer. The conformable layer 12 is also indented, and thus conforms to the indentation or deformation of the overcoat layer 14. The resulting maximum use of all the available contact area acts to improve bonding of the toner to the sheet material. Some toner particles may consist only of soft resin and pigment and may not even indent the overcoat layer 14 to any noticeable extent. These particles are fused by the adhesive forces of the overcoat layer 14. The presence of the conformable layer 12 allows uniform fusing pressure and compensation for any irregularities in the fusing rolls so that maximum surface contact is produced between toner and the two-layer coating.

The conformable layer 12 is also helpful in improving image resolution. Cold pressure fusing systems have a tendency, when operating with film, to spread the toner out over a larger area and with a lower thickness than when operating with paper. When narrow, unimaged areas occur between imaged areas, the unimaged areas tend to become filled in, resulting in reduced resolution. When the conformable layer 12 is present, the toner can move downward, into the coating, rather than laterally. This improvement allows sharper demarcation between imaged and unimaged areas. The pressure employed in cold pressure fusing systems ranges from about 3500 to about 10,000 psi (246–703 Kg/cm$^2$). The temperature of the system averages about 25° C., and ranges from about 20° C. to 30° C.

Advantages of this invention are further illustrated by the following examples, but the particular materials and amounts thereof recited in these examples, as well as other conditions and details, should not be construed to unduly limit this invention.

EXAMPLE I

The film base 10 was biaxially oriented and was formulated from polyethylene terephthalate. The film base thickness was approximately 100 micrometers. The conformable layer 12 was formed from a mixture containing 90 weight percent polyisobutylene and 10 weight percent Eastman CP-153-2. The polyisobutylene was designated by the trademark "Vistanex" L-100 and was manufactured by Exxon. The polyisobutylene-/Eastman CP-153-2 mixture was coated to the film base 10 from a solution comprising 57 weight percent heptane, 38 weight percent toluene, and 5 weight percent polyisobutylene/CP-153-2 blend by means of a rotogravure coater. The thickness of the thus formed conformable layer was 1.1 micrometers, and the coating weight was 0.97 g/m$^2$. The Shore hardness of the conformable layer was A34. The overcoat layer 14 was formed from polyvinyl acetate. The polyvinyl acetate was designated by the trademark "Vinac" B-100 and was manufactured by Air Products and Chemicals. The polyvinyl acetate was coated over the conformable layer 12 from a solution comprising 12 weight percent polyvinyl acetate in methanol by means of a rotogravure coater. The overcoat layer 14 included a roughening agent, "Pergopak" M-2, manufactured by Ciba-Geigy. The "Pergopak" M-2 urea-formaldehyde particles were present in the amount of 2 percent by weight of the solid "Vinac" B-100 polyvinyl acetate. The thickness of the overcoat layer was 1.1 micrometers and the coating weight of the overcoat layer was 1.29 g/m$^2$. The Shore hardness of the overcoat layer was D85.

The film base 10 was treated with a backside coating 16. The backside coating was polyvinyl acetate, which was designated by the trademark "Vinac" B-100. The backside coating 16 was applied to the film base 10 from a solution comprising 12 weight percent polyvinyl acetate in methanol by means of a rotogravure coater. In addition, the solution comprised "Cyastat" SN and "Cyastat" 609, each in an amount equivalent to one percent of the amount of "Vinac" B-100, based on the weight of the solid "Vinac" B-100.

Another feature added to the film base 10 was a roughened stripe 18 which was coated onto the leading edge of the film base 10. The purpose of the stripe 18 was to improve drive friction between the crush rolls and the film when introducing the film into the fuser. The stripe was formulated from white ink ("Wonderflex", manufactured by Inmont), two weight percent "Syloid" 620 amorphous silica particles manufactured by W. R. Grace & Co., three weight percent "Cyastat" SN and three weight percent "Cyastat" 609, all percentages being based on the weight of the ink solution.

EXAMPLE II

The coated film prepared in Example I was tested in several copying machines to determine the effectiveness of the novel coating. The property to be tested was toner adhesion. Toner adhesion was tested through the use of a Gardner scratch tester. This instrument consists of an arm resting upon a moveable table. The arm has attached to it a scratcher, which is in actuality a wire loop, similar in shape to the outline of a paper clip. This arm and loop combination are weighted to provide the desired scratching force. The imaged film is placed on the moving table, with the weighted scratcher resting upon the film. The table is moved through a certain distance, e.g. about 2 inches. The scratcher will scratch the image provided on the film. This test is performed on film which has been imaged with several black bars. The percentage of toner adhesion is calculated by the following formula:

$$\text{percent toner adhesion} = 100 \times \frac{\text{length of the undamaged portion of the scratched image}}{\text{total length of the scratch along the image}}$$

This test is essentially a mechanical simulation of the paper clip scratching test.

The results of the adhesion tests are set forth in Table I:

TABLE I

| Copying Machine[1] | Percent Toner Adhesion Control[2] | Percent Toner Adhesion Two-Layer Coating |
|---|---|---|
| Canon NP 120 | 60 | 96 |
| Pitney Bowes 5200 | 30 | 96 |
| Mita | 0 | 96 |
| Saxon S × 10 | 60 | 96 |

TABLE I-continued

[1]Each of the copying machines listed employs a cold pressure fusing system.
[2]The control film was identical to the test film, the only exception being that the elastomeric layer was absent from the control film.

From the foregoing, it can be seen that the two layer coating of the present invention is extremely effective in improving toner adhesion.

Although the Examples are concerned with electrostatic copying processes, i.e., xerography, the transparency of the present invention has utility in other electrostatic printing processes where electrostatic forces are used to form the image with powder directly on a surface.

What is claimed is:

1. A sheet material suitable for electrostatic production of transparencies comprising a film base made of synthetic, polymeric material, said film base having a toner receptive coating on at least one major surface thereof comprising a. a first layer coated over at least one major surface of said film base, said first layer being formed from an elastomer; and b. a second layer coated over said first layer, said second layer being formed from a polymeric material containing surface rougheners consisting of particulate material, the particulate material having a refractive index closely matching that of the coating and being relatively non-abrasive to the coating, the coefficient of static friction measured between the polymeric material of said second layer and the nonimage side of the like sheet material being equal to or less than about 0.5, said film base, said first layer, and said second layer all being transparent to visible light.

2. The sheet material of claim 1 wherein the first layer exhibits a Shore hardness of from about A30 to about A95.

3. The sheet material of claim 1 wherein the second layer exhibits a Shore hardness of from about D60 to about D90.

4. The sheet material of claim 1 wherein the elastomer which forms the first layer is selected from the group consisting of copolymers of styrene and butadiene, copolymers of styrene and isoprene, copolymers of styrene and ethylene, copolymers of styrene and butylene, and blends of the foregoing copolymers.

5. The sheet material of claim 1 wherein the elastomer which forms the first layer is polyisobutylene.

6. The sheet material of claim 1 wherein the polymeric material of the second layer is polyvinylacetate.

7. The sheet material of claim 1 wherein the polymeric material of the second layer is a terpolymer formed from methyl methacrylate, ethyl acrylate, and isobutylacrylate.

8. The sheet material of claim 1 wherein the synthetic transparent material is selected from the group consisting of polyester, polystyrene, cellulose acetate, acrylic, polycarbonate, and polypropylene.

9. The sheet material of claim 8 wherein the synthetic transparent material is polyethylene terephthalate.

10. The sheet material of claim 1 wherein the synthetic transparent material is further modified by having a primer coating interposed between said film base and said first layer.

11. The sheet material of claim 10 wherein the primer coating is selected from the group consisting of polyvinylidene chloride, and polyester resins.

* * * * *